(12) United States Patent
Dopp

(10) Patent No.: US 10,407,322 B2
(45) Date of Patent: Sep. 10, 2019

(54) ELECTROCHEMICAL DIGESTION OF ORGANIC MOLECULES

(71) Applicant: Robert Brian Dopp, Marietta, GA (US)

(72) Inventor: Robert Brian Dopp, Marietta, GA (US)

( * ) Notice: Subject to any disclaimer, the term of this patent is extended or adjusted under 35 U.S.C. 154(b) by 357 days.

(21) Appl. No.: 13/630,776

(22) Filed: Sep. 28, 2012

(65) Prior Publication Data

US 2013/0087466 A1    Apr. 11, 2013

Related U.S. Application Data

(60) Provisional application No. 61/544,478, filed on Oct. 7, 2011.

(51) Int. Cl.
  *C02F 1/461* (2006.01)
  *C02F 1/467* (2006.01)
  (Continued)

(52) U.S. Cl.
  CPC .............. *C02F 1/4672* (2013.01); *C02F 1/78* (2013.01); *C02F 2001/46133* (2013.01);
  (Continued)

(58) Field of Classification Search
  CPC .............. C02F 2101/30; C02F 2101/32; C02F 2101/38; C02F 2303/04; C02F 3/005; C02F 3/202
  (Continued)

(56) References Cited

U.S. PATENT DOCUMENTS 4,062,754 A * 12/1977 Eibl .............................. 204/268
5,032,239 A     7/1991 Sweeney
(Continued)

FOREIGN PATENT DOCUMENTS

CN     101041488 A * 9/2007 ................ C02F 1/46
SU      1692503 A1 * 11/1991 ................ A23J 1/04
(Continued)

OTHER PUBLICATIONS

International Search Report and Written Opinion dated Mar. 15, 2013.
(Continued)

*Primary Examiner* — Salil Jain
(74) *Attorney, Agent, or Firm* — Thomas Horstemeyer, LLP

(57) ABSTRACT

Various methods and systems are provided for electrochemical digestion of organic molecules. In one example, among others, a method includes providing an electrolyte fluid including organic molecules between the electrodes of a reaction vessel and applying a voltage wave shape to the electrodes of the reaction vessel to digest the organic molecules. No separator exists between the electrodes of the reaction vessel. In another example, a system for digesting organic molecules includes a reaction vessel, an electrolyte fluid including the organic molecules, and a power source. The reaction vessel includes a plurality of electrodes where no separator exists between the electrodes. The electrolyte fluid is provided between the plurality of electrodes of the reaction vessel and the power source can applies a voltage wave shape to the electrodes of the reaction vessel to digest the organic molecules.

33 Claims, 8 Drawing Sheets

(51) Int. Cl.
  *C02F 1/78* (2006.01)
  *C02F 101/30* (2006.01)
(52) U.S. Cl.
  CPC ............... *C02F 2101/30* (2013.01); *C02F 2201/46175* (2013.01); *C02F 2201/46185* (2013.01)
(58) Field of Classification Search
  USPC ................................ 205/588, 689, 695–698
  See application file for complete search history.

(56) References Cited

U.S. PATENT DOCUMENTS

| | | | | |
|---|---|---|---|---|
| 5,282,940 | A * | 2/1994 | Griffis et al. | 426/237 |
| 5,419,824 | A * | 5/1995 | Weres | C02F 1/46109 204/242 |
| 5,439,577 | A * | 8/1995 | Weres | C02F 1/46104 204/268 |
| 5,725,748 | A | 3/1998 | Brandt et al. | |
| 6,179,977 | B1 * | 1/2001 | Herbst | 204/242 |
| 6,224,744 | B1 * | 5/2001 | Casado Gimenez et al. | 205/756 |
| 6,547,951 | B1 * | 4/2003 | Maekawa | 205/688 |
| 6,572,759 | B1 * | 6/2003 | Nishimura et al. | 205/687 |
| 6,811,660 | B2 * | 11/2004 | Maekawa | C02F 1/46109 204/229.2 |
| 8,182,657 | B2 * | 5/2012 | Mason et al. | 204/242 |
| 2002/0014400 | A1 * | 2/2002 | Zadiraka et al. | 204/158.2 |
| 2002/0134674 | A1 * | 9/2002 | Andrews et al. | 204/242 |
| 2002/0172616 | A1 * | 11/2002 | Eynard et al. | 422/23 |
| 2006/0027463 | A1 * | 2/2006 | Lavelle et al. | 205/556 |
| 2009/0152123 | A1 * | 6/2009 | Butler et al. | 205/455 |
| 2009/0152212 | A1 * | 6/2009 | Kelsey et al. | 210/787 |
| 2010/0176039 | A1 * | 7/2010 | Honji et al. | 210/96.1 |
| 2011/0114496 | A1 | 5/2011 | Dopp et al. | |
| 2012/0031852 | A1 * | 2/2012 | Aglietto | 210/748.09 |

FOREIGN PATENT DOCUMENTS

| | | |
|---|---|---|
| WO | 2003/104152 A1 | 12/2003 |
| WO | 2009143629 A1 | 12/2009 |
| WO | 2010009058 A1 | 1/2010 |
| WO | 2010042987 A1 | 4/2010 |
| WO | 2010134717 A2 | 11/2010 |

OTHER PUBLICATIONS

Canadian Application No. 2,851,240 First Office Action dated Dec. 6, 2018.
First Examination Report for related AU Application No. 2012318934 dated Oct. 25, 2016.

* cited by examiner

ELECTROCHEMICAL DIGESTION OF ORGANIC MOLECULES

CROSS REFERENCE TO RELATED APPLICATIONS

This application claims priority to copending U.S. provisional application entitled "Electrochemical Digestion of Organic Molecules" having Ser. No. 61/544,478, filed Oct. 7, 2011, the entirety of which is hereby incorporated by reference.

BACKGROUND

Presently, organic molecules are broken down, or digested, using expensive enzymes, microbes or by using a water slurry of the organic molecules and driving it above 375 degrees C. under high pressure to spontaneously break down the molecules. This process is called "supercritical fluid" method where the temperature and pressure are above that where a distinct liquid and gas phases do not exist. Both methods work well, but are expensive to achieve. The first has a high cost of enzymes or microbes and the second a high-energy cost to heat the water slurry.

A well-known example of the use of enzymes is the making of ethanol from cellulose feed stock. The yeast needs C5 and C6 sugars to ferment into ethanol, but cellulose is composed of huge molecules including cellulose, hemicellulose and lignin with from many hundreds to many thousands of carbon atoms in each molecule. At present, the efficiency of the process is low, limiting the use of this alternative energy source.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
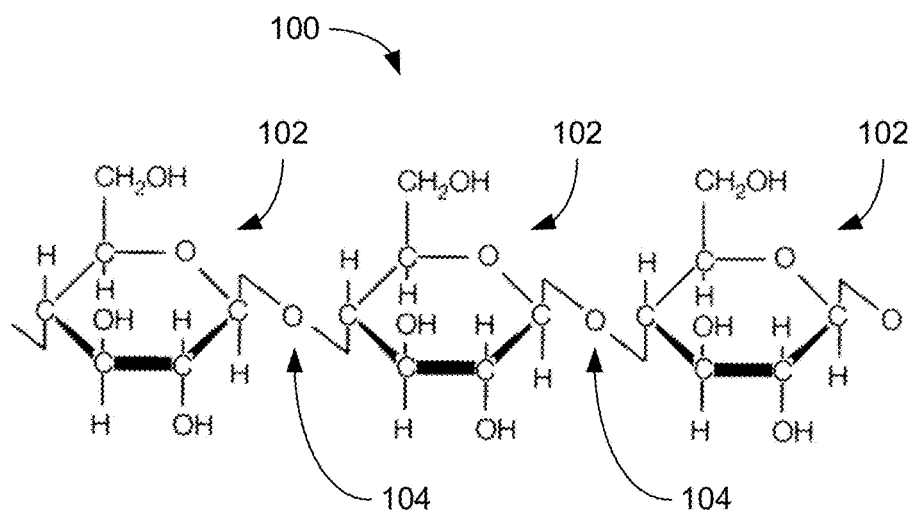
FIG. 1 is an illustration of a portion of a cellulose molecule.

Disclosed herein are various embodiments of methods and systems related to electrochemical digestion of organic molecules. Reference will now be made in detail to the description of the embodiments as illustrated in the drawings, wherein like reference numbers indicate like parts throughout the several views.

The breakdown of long-chain organic molecules may be accomplished electrochemically by passing an electrolyte including the organic molecules between energized electrodes that include a reactive surface. A varying voltage may be applied to the electrodes to produce singlet oxygen to decompose the organic molecules. When water is electrolyzed, diatomic hydrogen is generated from the moment it is split from water by: $2H_2O+2e^- \rightarrow H_2+2OH^-$. However, the oxygen is liberated as singlet oxygen (also called a "nascent oxygen" or "atomic oxygen") by the equation:

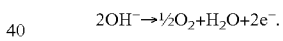

$2OH^- \rightarrow \frac{1}{2}O_2+H_2O+2e^-$.

The singlet oxygen may remain for several milliseconds or more before combining with another singlet oxygen to form the stable diatomic oxygen molecule $O_2$. In some cases, the singlet oxygen may remain for as long as a tenth of a second or more. If the atom reaches another reactive atom such as, e.g., carbon, hydrogen or oxygen within an organic molecule, it can react with that molecule, fracturing the long chain. Organic molecules such as, e.g., cellulose or proteins may be decomposed by reacting with the singlet oxygen. In the case of cellulose, which is composed of thousands of glucose rings, it will break this long chain into smaller fragments. When the singlet oxygen remains in the electrolyte for an extended period of time, the singlet oxygen can continue to react with the organic molecules as the electrolyte flows out of between the electrodes.

Organic molecules may include, e.g., cellulose, hemicellulose, lignin, starch (e.g., amylose and amylopectin) algae (e.g., for lipid extraction), viruses and bacterium for decontamination, etc. FIG. 1 illustrates a portion of a cellulose molecule 100. A cellulose molecule includes up to tens of thousands of these six-carbon glucose molecules 102 connected with an oxygen atom 104. It seems likely that it is the oxygen that is being attacked since it is not in the stable ring. The oxygen may be the atom attacked by the hydroxyl or the singlet oxygen since it is oxygen that links the many sugar rings in the cellulose molecule, making it more exposed than the atoms within the organic ring. For example, the singlet oxygen may react with the glucose-bonding oxygen 104, breaking the long chain into smaller segments and ultimately into glucose 102. The singlet atom may attack any of the three reactive elements present in an organic molecule: a carbon to form CO and $CO_2$, hydrogen to form $H_2O$ or another singlet oxygen to form diatomic oxygen gas. The hydrogen may combine with any lipids or oils in a classic hydrogenation reaction.

The organic molecules may be decomposed very efficiently when the proper waveform (or wave shape) is applied to the electrodes of a reaction vessel. The process may also be used to kill pathogens in microbiology laboratories or to render the lipids from the cell vesicles in algae. Shortening of the chain, removing excess oxygen atoms, breaking cell walls, and/or destroying organisms may be carried out on organic molecules such as, but not limited to, cellulose, hemicellulose, lignin, starch (e.g., amylose and amylopectin) algae (e.g., for lipid extraction), viruses and bacterium for decontamination, etc. Any organic compound may be attacked using this method. Applications may include but are not limited to:

Increasing the energy density of organic materials such as, e.g., cellulosic and lignin materials, among others, by reducing the oxygen content in component chains;

Breaking the thousands of carbon cellulose chain into C5 or C6 sugars for cellulosic ethanol production;

Breaking open (or lyse) the vesicle wall of algae containing lipids for bio-fuels;

Destroying biological agents such as viruses and bacterium through oxidation of their protein membranes, etc.; and/or Digesting organic molecules such as, e.g., cellulose, polysaccharides, lignin, hemicellulose, proteins, algae, viruses, bacterium and/or solids suspended in wastewater.

The reaction vessel may include one or more cells defined by electrodes where electrolyte including organic molecules can be disposed between the electrodes for electrochemical digestion. The reactive surface of an electrode may include, e.g., a metallic current collector coated with a plurality of nano powders to catalyze the reaction to increase the surface area. In other implementations, the electrodes may include, but are not limited to: metallic electrodes with some amount of platinum metal plated or added such as nano powders on the surface; titanium electrodes with a flash plating of platinum; or electrodes catalyzed with noble metals such as, e.g., platinum, ruthenium or palladium and/or mixtures or alloys thereof. In some cases, the noble metal catalysts may be mixed or alloyed with other transition metals.

In various embodiments, a high-surface area electrode may include three components. The first component may be a substrate such as a plate or other structure having a regular or complex geometry and having a smooth or rough surface and consisting of transition metals including among others, nickel, iron, stainless steel, or silver. The first component may be defined by a reticular structure, a plate, a random textile, channeled, dendritic, foam, or other self-similar patterned or unpatterned structure with internal channels and/or external grooves and/or pits, spines, fins, or any kind of structure that permits fluids or fluid components to reach a surface or surfaces thereof, including a surface of a material layered on the substrate, either by convection, advection or diffusion. The second component may include one or more transition metals such as, e.g., nickel, gold, silver and/or other metals attached to (or disposed on) the first component, for example by electroplating. The third component may include metal particles such as, e.g., nano-sized metal particles and/or mixed nano-micron sized particles of transition metals including, but not limited to, iron, tin, nickel, silver, manganese, cobalt and alloys and oxides of these metals.

The third component may be partially embedded in the second component and may principally include nano and/or micron sized particles partially embedded in the second component but exposed such that when the completed electrode is immersed in the electrolyte, the third component is in intimate contact with the electrolyte. The third component may be partially covered by the second component but, due to the second component's overlying the third component closely, so conforming to the third component size and shape that the third component imparts a roughness to the surface of the second component that is responsive to the size and shape of the third component. This electrode may be used in electrochemical devices, including, but not limited to, hydrogen-generating electrodes in a water electrolyzer system, organic digestion systems and/or fuel cells. The very high surface area, with a high percentage of surface atoms, may render the surface highly catalytic to the splitting of water molecules in the presence of electrical energy.

Nano catalysts may be attached to current collecting surfaces of the electrode. By electroplating the surface with a metallic material, nano particles are entrapped within the electroplated metallic layer to permanently adhere the particles to that surface. The catalysts may include metals, metal oxides, or a mixture of metals, alloys and/or their oxides. Noble metals may also be included to catalyze or enhance the reaction. The resulting electrode can be arranged to produce an apparatus with a very high rate and high efficiency of water electrolysis. A method for the coating of an electrode is described in "Electrochemical Devices, Systems and Methods" (U.S. Patent App. Pub. 2011/0114496, published May 19, 2011, and PCT Pub. WO 2010/009058, published Jan. 21, 2010), which are hereby incorporated by reference in their entirety.

One way to coat an electrode with nano catalysts is where the particles exhibit very low impedance while allowing them to freely interact with the liquid boundary layer for electrochemical activity. The nano catalytic powders are entrapped within a plating substrate such as, e.g., nickel, copper, tin, silver and/or gold. The coating may be applied on all surfaces inside and outside of a complex porous shape such as, e.g., a foam surface. The foam surface may be welded to a solid base plate prior to coating. The loading of nano powders may be increased from 1% of the bath weight to 5% to 10% of the plating solution weight. The pH may also be lowered from a pH of 4 to a pH of 2. The plating is first applied with a short burst of current in a forward direction, entrapping the powders under the coating. A rest period allows for ionic diffusion to rebalance the ionic concentrations. A reverse pulse is than applied to strip the plated metal from the top of each nano particle. The sequence may be repeated to increase the amount of nano catalytic powder coating the electrode. For example, in one implementation a 14 $cm^2$ foam electrode was coated by applying +30 Amps for about 0.5 mSec; 0.0 Amps for about 9.5 mSec; −10 Amps for about 0.75 mSec; 0.0 Amps for about 0.25 mSec; and repeating the cycle for about 48.88 minutes to give 2000 ASec of coating.

The coated electrode may be used for electrolysis of water to produce hydrogen and/or oxygen at an efficient and high rate. The electrode may function as an anode or a cathode. The singlet oxygen produced on the anode of the electrolyzer may be used to degrade and digest organic molecules and the hydrogen produced at the cathode of the cell hydrolyzes any lipids present in the electrolyte fluid. The energy to do this is low as compared to the previous methods. Other examples of electrode designs include, but are not limited to, platinum particles adhered to a titanium plate, nano catalyst(s) adhered to stainless steel plate, a flat metallic surface of transition metal(s), nano catalyst(s) adhered to a two-dimensional surface or to a three-dimensional surface such as e.g., a metallic foam or a metallic sheet or foam that is corrugated, folded, or patterned.

Figure 2:
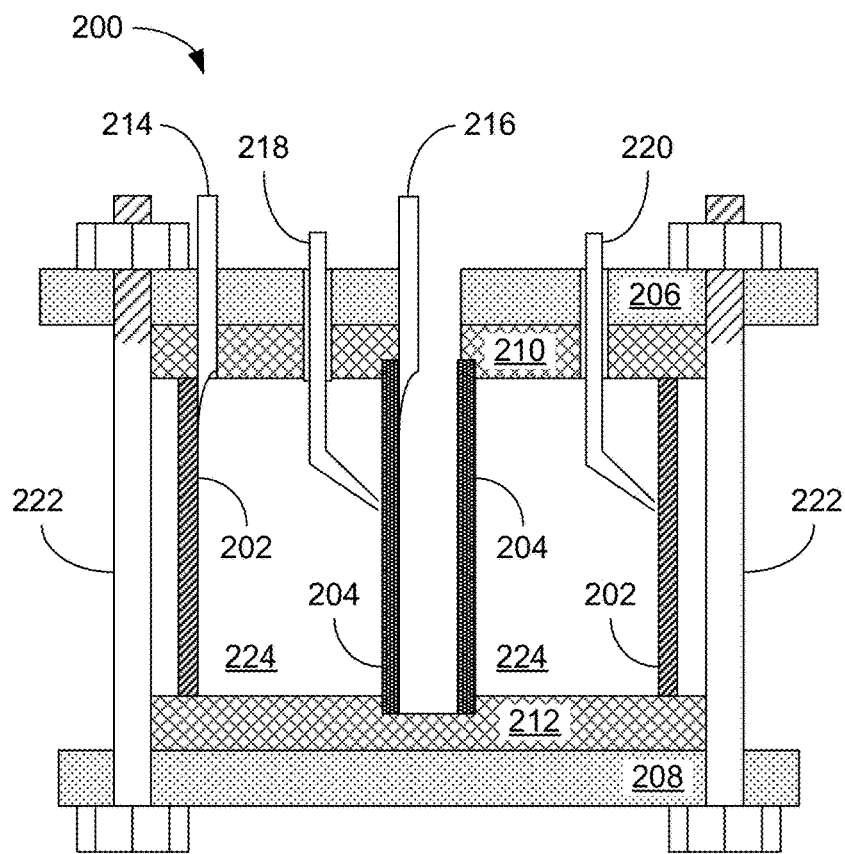
FIG. 2 is a cross-sectional view of an example of a circular reaction vessel in accordance with various embodiments of the present disclosure.

Referring to FIG. 2, shown is a cross-sectional view of an example of a circular reaction vessel 200 including an outer electrode 202 and an inner electrode 204. The single cell reaction vessel 200 of FIG. 2 may be made from end plates 206 and 208 of, e.g., stainless steel 316 (SS316) and inner insulators 210 and 212 of, e.g., ⅜" sintered Teflon®. The sidewalls may be the outer electrode 202 (e.g., a 4-inch ID SS316 tube) and the inner electrode 204 (e.g., an 1-inch OD SS316 tube) of approximately the same height. For example, the sidewalls may be about 2 inches tall. Electrical contact may be made via contact rods 214 and 216. Also included in the example of FIG. 2 are Lugen's electrode tubes 218 and 220 for continuous reference electrode monitoring of the reactor's electrodes during operation. In some implementations, pure zinc wire is used as a reference metal. The reaction vessel may be held together using e.g., eight 3 inch long, ⁵⁄₁₆" SS316 bolts 222 and nuts, each tightened to a torque of about 20 inch-pounds. Inlet and outlet connections can be included to allow a fluid such as an electrolyte including organic molecules to fill the chamber between the outer electrode 202 and inner electrode 204. In the example of FIG. 2, a single cell 224 defined by the outer and inner electrodes 202 and 204 contains the electrolyte. No separator is included between the electrodes 202 and 204 and thus separate cathodic and anodic chambers are not formed, which simplifies the design of the reaction vessel 200. Dimensions of the reaction vessel 200 may be varied to increase processing capabilities.

Figure 3A:
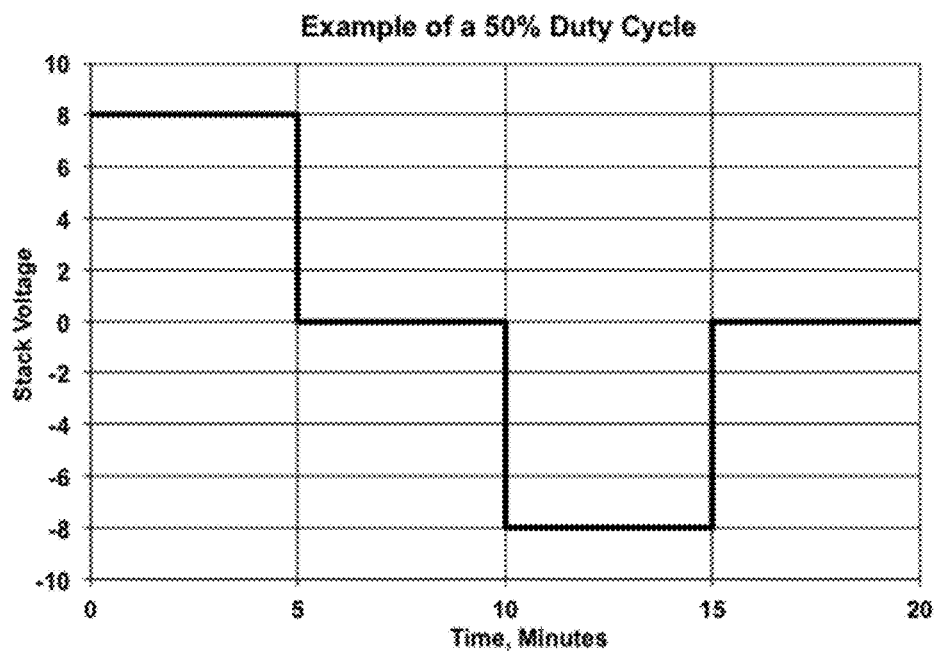
FIGS. 3A and 3B are plots of examples of wave shapes applied to electrodes of a reaction vessel of FIGS. 2, 6, and 10 in accordance with various embodiments of the present disclosure.
Figure 3B:
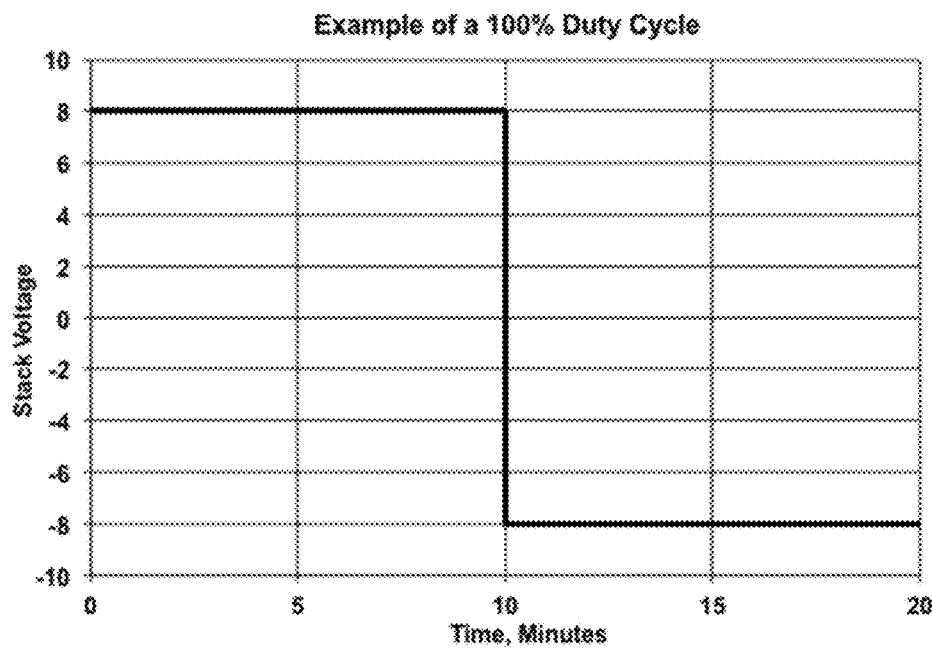

Organic molecules may be decomposed within the reaction vessel 200. With an electrolyte including the organic molecules disposed within the cell 224 of the reaction vessel 200, a varying voltage can be applied between the inner and outer electrodes 204 and 202 to produce the singlet oxygen to decompose the organic molecules. FIGS. 3A and 3B show examples of the voltage wave shape applied to the electrodes 202/204. The wave-shape of the applied voltage may be a square wave, sine wave, or other appropriate alternating wave shape. FIG. 3A illustrates a stepped square wave at with a 50% duty cycle and FIG. 3B illustrates a square wave at 100% duty cycle. The zero current time that is present with a duty cycle of less than 100% may improve the digestion of the organic molecules, which may be attributed to the time it takes for the singlet oxygen to react with the organic molecule. Operation at a low frequency was found to improve the decomposition of polysaccharides, but other frequencies and/or flow rates may provide the best results for other organic molecules. The voltage wave shape may be applied in a range of about 100 Hz or lower, a range of about 10 Hz or lower, a range of about 1 Hz or lower, a range of about 0.1 Hz or lower, a range of about 10 mHz or lower, a range of about 1 mHz or lower, or a range of about 0.1 mHz or lower.

Various experiments were performed using cornstarch to verify the digestion of organic molecules. The electrolyte can be produced using an easily ionized compound such as, e.g., sodium chloride (NaCl), potassium hydroxide (KOH), sodium hydroxide (NaOH), hydrochloric acid (HCl), among many others. In some implementations, concentrations of the ionized compound may be in the range of about 5% or less, in the range of about 2% or less, in the range of about 1% or less, in the range of about 0.75% or less, or in the range of about 0.5% or less. The electrolyte may be prepared by mixing the ionized compound solution, followed by a slow heating to about 100° C. and subsequent cooling while continuously stirring the solution. If glucose is added, it may be added to the hot electrolyte before cooling. The electrolyte fluid allows the charge to be carried between the electrodes. In some implementations, the reaction vessel 200 of FIG. 2 held a 1% KOH electrolyte solution including about 300 ml of 1% cornstarch. In other implementations, the electrolyte inside the reaction vessel was a 1% NaCl electrolyte solution including 1% starch and about 0.3% glucose. In the experiments, there was no circulation except natural convection produced by gas and/or heat generation by the reaction.

The concentration of starch in solution was determined based upon the colorimetric method using the well-known starch iodine reaction. The electrolyte was used a detector solution consisting of 0.35 cc of 1% Iodine (I) and 0.35 cc 1% potassium iodide (KI) in water. The maximum absorption wavelength was found to be 620 nm. A calibration curve was developed using serial dilutions from the 1% starting point giving the relationship of:

$$\text{Percent starch} = -0.0065 * LN(\% \ T) - 0.0001$$

where $LN(\% \ T)$ is the natural logarithm of the percent of 620 nm light transmitted through a tube of fluid within the spectrophotometer.

Figure 4:
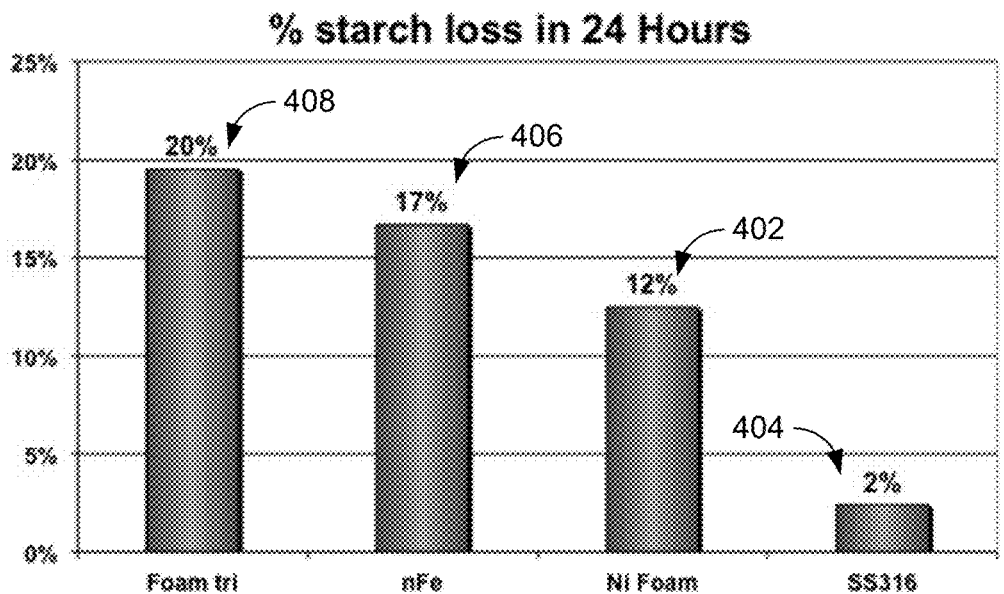
FIG. 4 is a bar graph comparing starch digestion for four conditions of the reaction vessel of FIG. 2 in accordance with various embodiments of the present disclosure.

Referring to FIG. 4, shown is a bar graph comparing starch digestion within the circular reaction vessel 200 of FIG. 2 using different electrode materials. Using the 50 Hz, 50% duty square wave of FIG. 3, 24-hour digestion experiments were performed using the circular reaction vessel 200 with four different electrode materials: smooth SS316, Ni Foam, smooth SS316 coated with nano iron (nFe), and foam coated with a tri-nano recipe (foam tri). The Ni Foam was INCO foamed nickel with 1450 $g/m^2$ density and 4.5 mm thick and a pore size of about 600 um diameter. As seen in FIG. 4, digestion with the Ni Foam (bar 402) is more effective than digestion with the smooth SS316 (bar 404). This may be due to the increase in surface area. Coating the smooth SS316 with nano iron (nFe) improved the digestion (bar 406). The foam coated with a tri-nano recipe of nFe, nCo and nSn showed the highest amount of digestion (bar 408) proving the feasibility of the use of the nano coated electrodes as part of an organic digester. Other formulations of nano powders may also be used.

As the amount of digestion increased, the lower the temperature rise of the reaction vessel 200 (FIG. 2). This indicates that while the input energy remained the same for the experiments, when digestion was being accomplished less of that energy was being dissipated as heat because of the additional electrochemical work being accomplished. This may be related to an increase in the formation of singlet oxygen, which may result from an increase in the electrode surface area. The use of circular electrodes 202/204 with dramatically different surface areas may also have affected the results. The surface area of outer and inner electrodes 202/204 varied by a factor of 3.5:1. The surface area ratio plays an electrochemical role where the inner electrode 204 is running at a current density that is 3.5 times higher than the outer electrode 202. The current density imbalance as the polarity swings from positive (anodic singlet oxygen generating with subsequent organic digestion) to negative (diatomic hydrogen generation with quenching effect) may limit the effectiveness of the circular design.

The effect of the formation of singlet oxygen on the electrode material was examined using its reaction with iron from the SS316. Referring to FIG. 4A, shown is a graph of iron corrosion versus applied frequency. The circular reaction vessel 200 of FIG. 2 containing a 1% NaCl electrolyte was used to study the corrosion of iron from SS316 as a function of the frequency of the applied voltage wave shape. All wave-shapes at the different frequencies were the 50% duty square wave illustrated in FIG. 2A except where a DC voltage was applied. Each experiment was run at 0.5 AHrs with a peak-to-peak voltage of 40 volts. To evaluate the effect on the nFe coating, a set of standard iron chloride concentrations was prepared to calibrate a spectrophotometer. It was determined that the maximum absorption (lowest light transmission) was achieved at 405 nanometers and a calibration curve was built at that wavelength. The resulting concentration was then converted to grams of iron/0.5 AHrs.

Figure 5A:
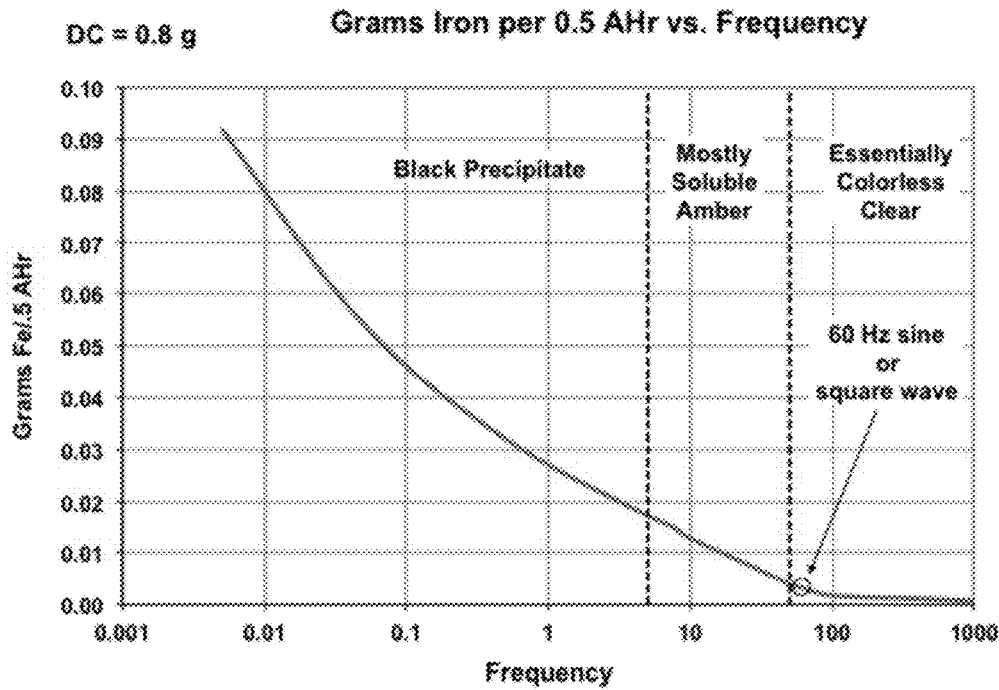
FIG. 5A is a graph of an example of iron corrosion versus frequency of a wave shape applied to the reaction vessel of FIG. 2 in accordance with various embodiments of the present disclosure.

At DC, the singlet oxygen never sees the neutralizing hydrogen, so it attacks the iron vigorously. As the applied frequency is increased, hydrogen is delivered more quickly to the singlet site where it reacts, reforming a water molecule. As can be seen in FIG. 5A, the amount of corrosion is very low by 50 Hz and it is almost non-existent, dropping to nearly zero, by 100 Hz. At this point, the rapidly changing polarity causes the singlet oxygen to recombine with the hydrogen produced at the same site to form water. This strongly suggests that the singlet oxygen finds a partner within about 2.5 milliseconds (mSec) or about the "off" time of the applied voltage wave shape at 100 Hz. It has either combined with another singlet oxygen to form diatomic oxygen or reacted with some available atom such as hydrogen or a metallic atom such as iron. Below 100 Hz, a race between reacting with the iron in the SS316 or the organic molecule is underway when using the 1% NaCl electrolyte. Above this frequency, digestion is unlikely because the singlet oxygen has not had enough time to react with the organic molecule. A voltage frequency between 0.1 Hz and 100 Hz, between 20 and 80 Hz, or between 40 and 60 Hz will produce desirable digestion of the organic molecules.

As shown in FIG. 5A, metals like iron is exhibit a higher corrosion rate as the applied voltage frequency is lowered when using a NaCl electrolyte. This also shows the effect of the singlet oxygen on any other atom that is available to react with it. This may be compensated by utilizing a different electrolyte. For example, a 1% KOH electrolyte may be used instead. The KOH loading is a low enough to not have spontaneous degradation of organic molecules, but high enough (e.g., with a pH of 13) to allow good ion transport for the electrochemical reactions needed for organic degradation. The wave shape of the applied voltage may also be as important as the frequency. The "off" or zero current time of the applied voltage wave shape may also affect the digestion of the organic molecules so that adjusting the duty cycle, as well as the frequency, may result in longer dwell time for the singlet oxygen.

Figure 5B:
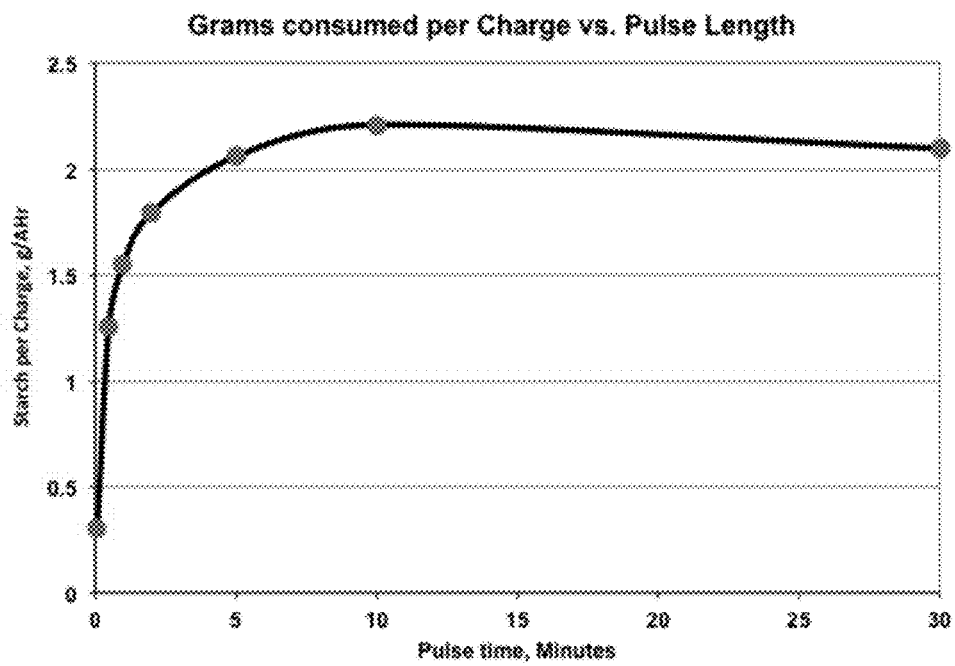
FIG. 5B is a graph of an example of degradation of starch as a function of frequency applied to the reaction vessel of FIG. 2 in accordance with various embodiments of the present disclosure.

Experiments were run using a 1% KOH electrolyte solution including 1% starch at room temperature. The experiments were carried out at various frequencies with a 100% duty cycle. FIG. 5B shows the degradation of starch as a function of the applied frequency, using the same galvanic charge and a 100% duty cycle. Performance improved as the frequency was lowered until about a 10 minute cycle (about 0.83 mHz) was reached, where the performance began to decrease again. As the applied voltage approached DC, performance was good. While not as extensive as with the NaCl electrolyte, floating debris in the electrolyte indicated that there was some degradation of the electrodes as the frequency was lowered.

Figure 6:
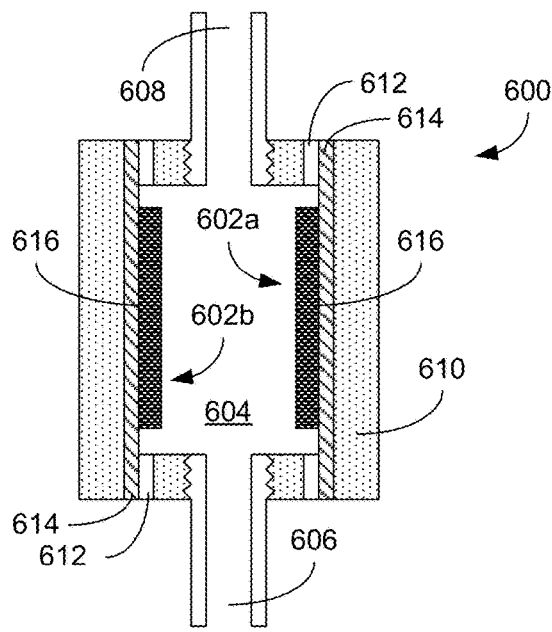
FIG. 6 is a cross-sectional view of an example of a single cell planer reaction vessel in accordance with various embodiments of the present disclosure.

Referring now to FIG. 6, shown is a cross-sectional view of an example of a single cell reaction vessel design including a planer reaction vessel 600 with parallel electrodes 602 on either side of the cell 604, which may be made of a variety of materials. Use of a flat-plate reaction vessel 600 with an inlet 606 and outlet 608 for filling and venting of the cell 604 resolved the current density imbalance between the electrodes 602. In one embodiment of the reaction vessel 600, the cell body 610 is composed of ⅜" Noryl blocks, each with square outside dimensions of about 2 inches. A gasket 612 made of, e.g., soft Teflon may be used to seal the electrolyte within the cell 604 with an internal volume of about 28.5 ml. The electrodes 602 include two monofunctional electrodes. The electrodes 602 may include a substrate 614 (e.g., a stainless steel 316 plate) onto which is secured (e.g., welded) a porous metal component 616 (e.g., a section of nickel foam). Other metals such as, e.g., titanium or nickel may also be used. The porous metal component 616 may be nickel foam that is about 3.75 cm square (or about 14 $cm^2$). In other embodiments, electrode sizes can range from about 100 $cm^2$ to about 1000 $cm^2$ or more. A mixture of nano catalysts (e.g., a tri-nano recipe of nano Co, Ni and Sn) may be adhered to the electrode 602 as describe above. Other catalysts such as, e.g., titanium, platinum, or other non-noble metal nano catalysts may be used. No separator is included between the electrodes 602 and thus separate cathodic and anodic chambers are not formed, which simplifies the design of the reaction vessel 600. Electrical contacts are also provided to couple to the power source for application of the voltage wave shape. Dimensions of the reaction vessel 600 may be varied to increase processing capabilities.

Figure 7A:
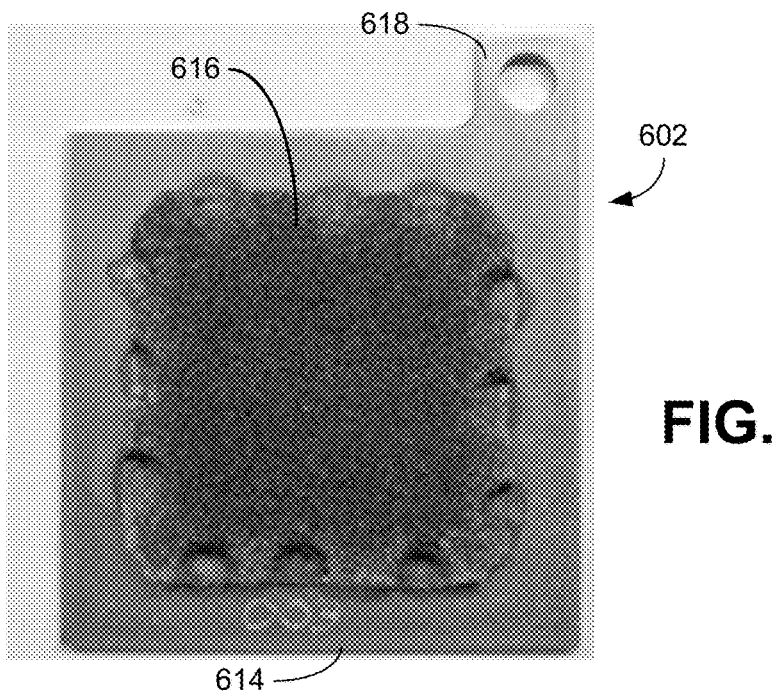
FIGS. 7A and 7B are photographs of examples of electrodes of a reaction vessel of FIGS. 6 and 10 in accordance with various embodiments of the present disclosure.
Figure 7B:
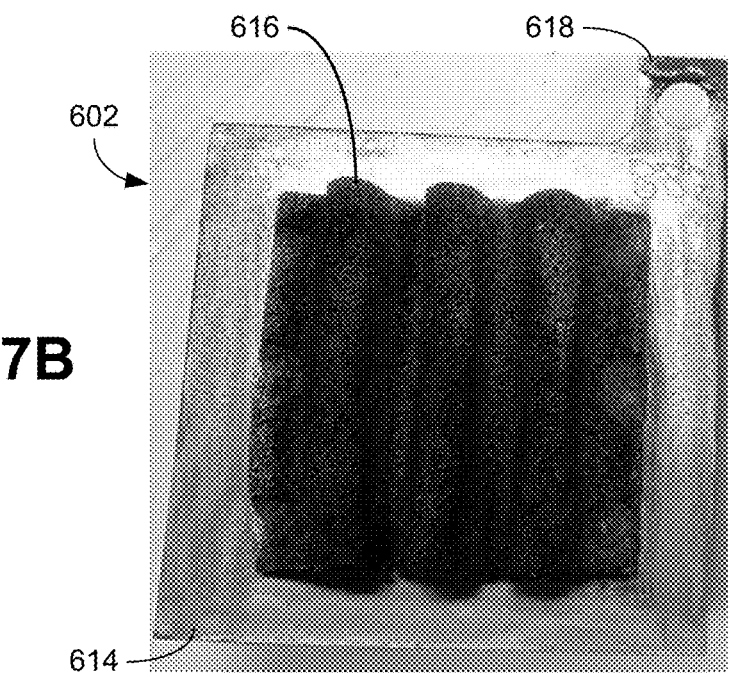

FIGS. 7A and 7B are pictures of examples of an electrode 602. The porous metal component 616 is spot welded to the substrate 614, which renders an active central portion surrounded by a solid low-corrosion current-collecting plate that extends to the sides of the reaction vessel 600. The substrate 614 may be made of, e.g., stainless steel, nickel, or other suitable material. The porous metal component 616 may be, e.g., nickel foam or other suitable material as discussed above. The shape may be square, rectangular, circular, polygonal or other shape as can be understood. Three-dimensional shapes may also be utilized to increase the surface area of the electrode 602. FIG. 7B illustrates a corrugated electrode, which increases the exposure of the reactive surface to the electrolyte in the cell. The porous metal component 616 may be nickel foam that is spot welded to a substrate 614 of nickel Dexmet material. A contact tab 618 for connection to the power source may be gold plated to improve conductivity.

Referring back to FIG. 6, during operation, electrolyte including the organic molecules may be passed through the reaction vessel 600 via the inlet and outlet connections 606/608 and the electrodes 602 are energized by a power source to digest the organic molecules. During the cycle in which electrode 602a is negatively charged, hydrogen gas and hydroxyl ions are evolved from that electrode 602a while consuming two water molecules and two electrons ($2H_2O+2e^- \rightarrow 2OH^- + H_2$). The hydroxyl molecule diffuses to the positive electrode 602b where the hydroxyl ions liberate their electrons into the plate while creating a singlet oxygen (or nascent oxygen) and one water molecule ($2OH^- \rightarrow \frac{1}{2}O_2 + H_2O + 2e^-$). The electrons exit into that positive electrode 602b. The singlet oxygen breaks down the organic molecules as described above. The polarity of the electrodes 602 is alternated when driven by, e.g., the 50% or 100% duty cycle illustrated in FIGS. 3A and 3B.

Figure 8:
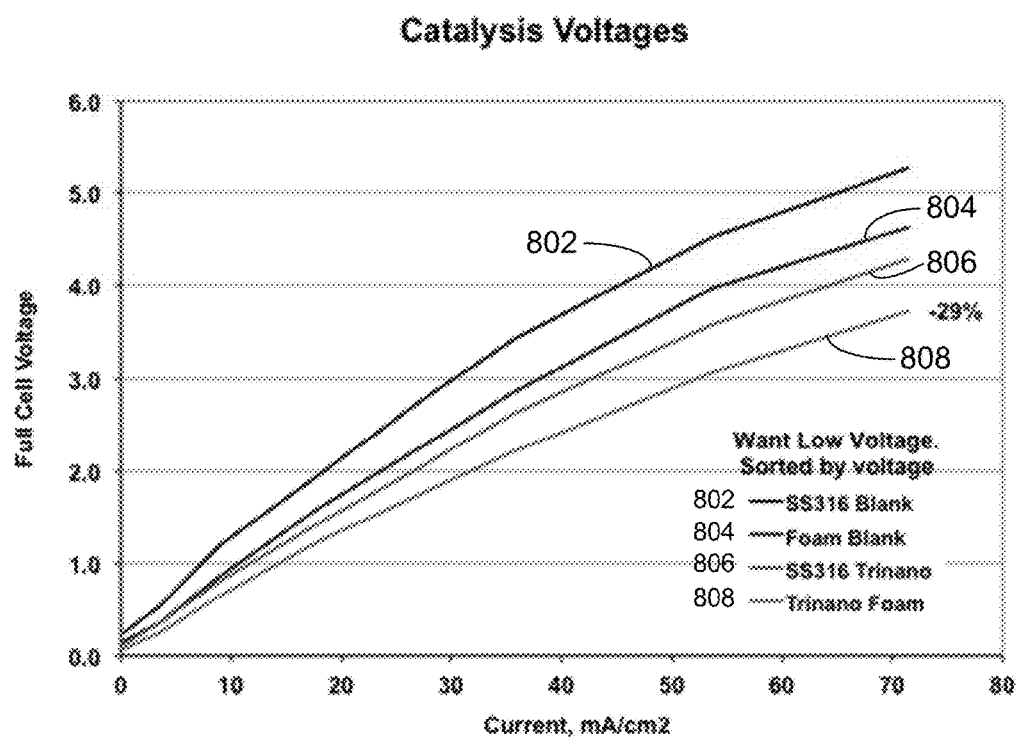
FIG. 8 is a polarization curve for a planer reaction vessel of FIG. 6 with a square cell in accordance with various embodiments of the present disclosure.

Referring now to FIG. 8, shown is a plot illustrating the full cell voltage with respect to the current (or polarization curve) of the single cell reaction vessel of FIG. 6. Using the single cell device 600, precise polarization measurements were made using four different electrode configurations: SS316 (curve 802), Ni Foam (curve 804), SS316 trinano (curve 806), and trinano foam (curve 808). A 1% NaCl electrolyte was used with no organic molecules so the reaction product was simply hydrogen and singlet oxygen, which spontaneously recombined back to water. The driving currents were supplied at a 50 Hz, 50% duty cycle as illustrated in FIG. 3A. The slope of a polarization curve is resistance by Ohms Law (R=V/I). This impedance is both "real" impedance caused by electrolyte and the component resistance and "imaginary" impedance (also called reactance) caused by electrochemical efficiency and the double layer capacitance. All the "real" impedance is the same in the four lines shown, but the efficiency changes dramatically. The "real" impedance may be improved through design changes like electrode spacing, number of cells and total surface area.

As can be seen from FIG. 8, the lower the voltage at any one current density, the higher the catalytic activity and the more efficient the electrochemical process. As electrochemical efficiency improves, the temperature rise should be lower because the temperature rise is driven by the wattage which is the product of the voltage times the applied current. As the voltage goes down, so does the wattage and the temperature rise.

Figure 9:
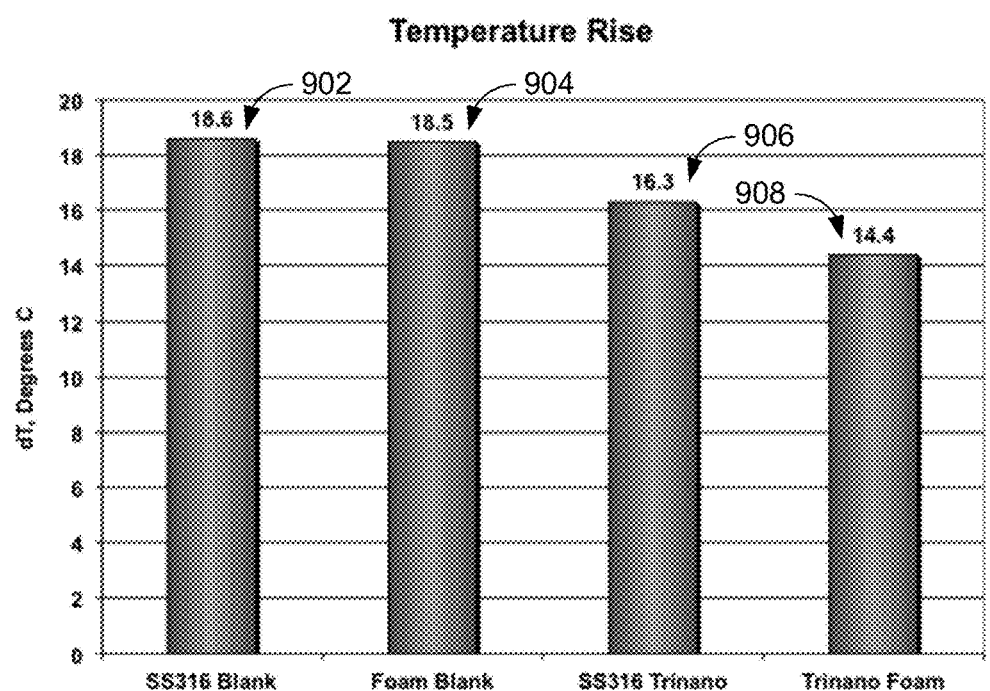
FIG. 9 is a bar graph comparing temperature rise for four coating designs of the reaction vessel of FIG. 6 in accordance with various embodiments of the present disclosure.

FIG. 9 illustrates the temperature rise for each of the four electrode configurations: SS316 (bar 902), Ni Foam (bar 904), SS316 trinano (bar 906), and trinano foam (bar 908). In this way, the reduced temperature rise can allow the system to operate at temperatures below 100 degrees C., below 50 degrees C., or below 30 degrees C. All embodiments discussed herein were operated at less than 50 degrees C. and usually below 30 degrees C. A single set of experiments was performed at 75 degrees C. to confirm that the rate of digestion is not temperature dependent. Temperature independent operation indicates that an electrochemical event controls the digestion, and not a chemical event.

Figure 10:
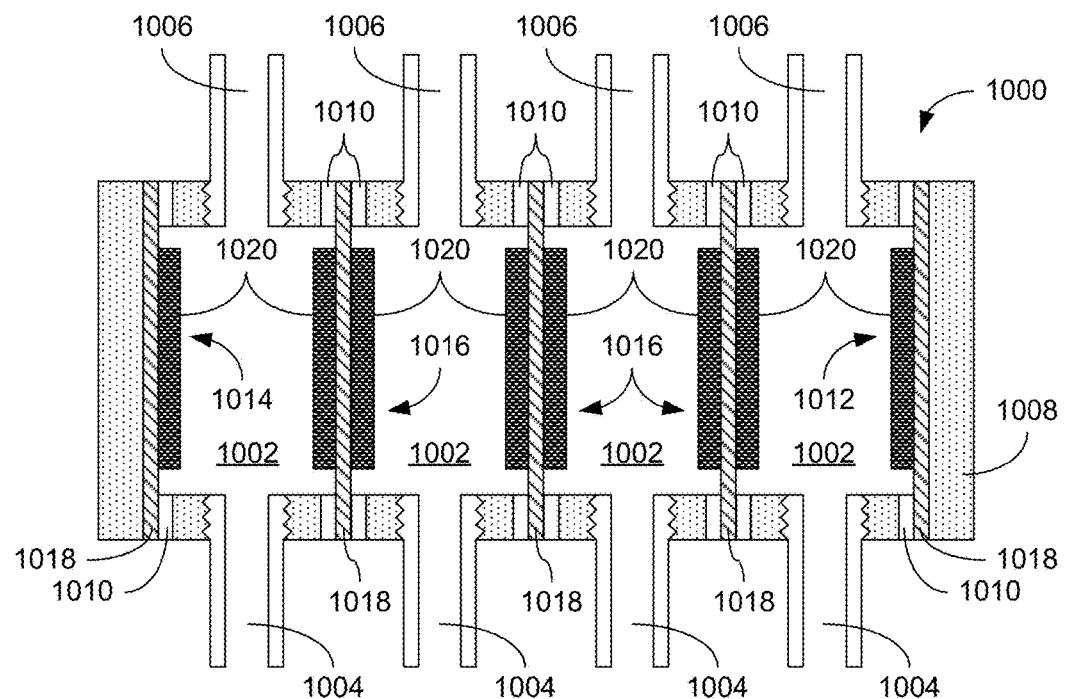
FIG. 10 is a cross-sectional view of an example of a four-cell planer reaction vessel in accordance with various embodiments of the present disclosure.

The effectiveness of the reaction vessel may be improved by utilizing a plurality of cells to increase the total electrode surface area. FIG. 10 shows an example of a four-cell reaction vessel 1000. Electrolyte may flow in parallel through the cells 1002 with the electrodes connected in electrical series. In one embodiment, the reaction vessel 1000 has a surface area of 14 cm$^2$ per electrode. This gives a total of 112 cm$^2$ of electrode surface exposed to the circulating electrolyte. In other embodiments, electrode sizes can range from about 100 cm$^2$ to about 1000 cm$^2$ or more. In the example of FIG. 10, the reaction vessel 1000 includes four cells 1002 manifolded together both at the inlet 1004 and the outlet 1006. The inlet and outlet ports 1004 and 1006 may be, e.g., a set of ⅛" NPT "quick connect" hose fittings. The cells 1002 may be within a cell body 1008 composed of, e.g., Noryl blocks and gaskets 1010 made of, e.g., soft Teflon. The electrodes include two monofunctional electrodes on each end 1012 & 1014 and three bifunctional electrodes 1016 in the interior of the cells 1002. The electrodes 1012/1014/1016 may be built of a stainless steel 316 plate 1018 onto which is welded nickel foam 1020 such as, e.g., the electrodes 602 pictured in FIGS. 7A and 7B. A mixture of nano catalysts (e.g., a tri-nano recipe of nano Co, Ni and Sn) 806 may be adhered to the electrode 1012/1014/1016 according to the teachings of U.S. Patent App. Pub. 2011/0114496 as discussed above. No separator is included between the electrodes 1012/1014/1016 and thus separate cathodic and anodic chambers are not formed, which simplifies the design of the reaction vessel 1000. Dimensions of the reaction vessel 1000 may be varied to increase processing capabilities.

Figure 11:
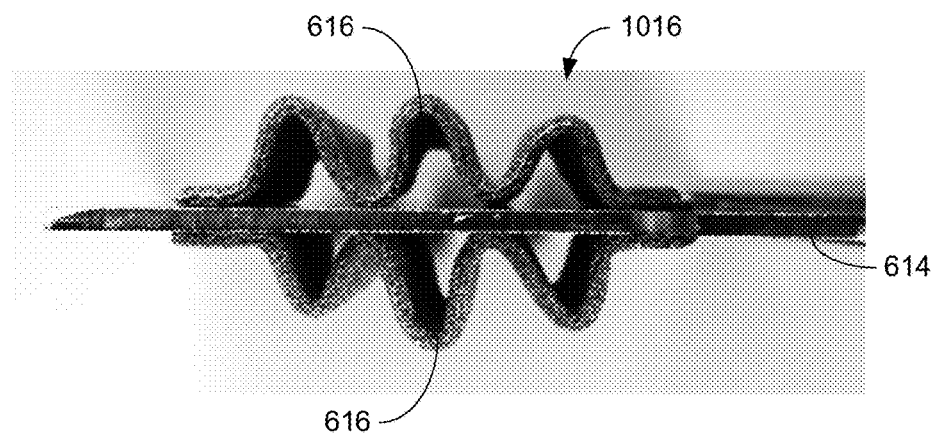
FIG. 11 is a photograph of an example of an electrode of a multi-cell reaction vessel of FIG. 10 in accordance with various embodiments of the present disclosure.

The monofunctional electrodes 1012/1014 can include a porous metal component 616 spot welded to one side of the substrate 614 and the bifunctional electrodes 1016 can include porous metal components 616 spot welded to both sides of the substrate 614. FIG. 11 shows a top view of an example of a bifunctional electrode 1016 with corrugated porous metal components 616 spot welded to both sides of the substrate 614. Referring back to FIG. 10, an electrical connection is made at the two monofunctional electrodes 1012 and 1014. Electrical contacts (not shown) are also provided for the two monofunctional electrodes 1012 and 1014. The electrodes 1016 in the interior of the cells 1002 receive their electrons from the ions involved in the electrochemical reactions. The electrodes 1012/1014/1016 may be spaced apart to maximize efficiency of the system. For example, the space between the electrodes 1012/1014/1016 may be in the range from about 0.75" (19 mm) to about 0.063" (1.59 mm), from about 0.375" (9.53 mm) to about 0.063" (1.59 mm), and from about 0.288" (4.76 mm) to about 0.063" (1.59 mm). Dimensions of the reaction vessel 600 may be varied to increase processing capabilities.

The example of FIG. 10 includes one reaction vessel 1000 with one set of electrodes. In other embodiments, the reaction vessel 1000 may include multiple sets of electrodes with each set arranged in series such that the electrolyte sequentially flows through each set of electrodes. The sets of electrodes include two monofunctional electrodes 1012/1014 and may include one or more bifunctional electrode(s) 1016 between the monofunctional electrodes 1012/1014 as can be understood. In some implementations, a plurality of reaction vessels 1000 may be connected in series, parallel, or a combination thereof such that the electrolyte flows through each reaction vessel 1000.

During operation, electrolyte including the organic molecules may be passed through the reaction vessel via the inlet and outlet connections 1004/1006 and the electrodes 1012/1014/1016 are energized to digest the organic molecules. During the cycle in which electrode 1012 is negatively charged, hydrogen gas and hydroxyl ions are evolved from that electrode while consuming two water molecules and two electrons ($2H_2O+2e^- \rightarrow 2OH^-+H_2$). That hydroxyl molecule diffuses to the first bifunctional plate 1016 where that hydroxyl liberates its electron into the plate while creating a singlet oxygen (or nascent or atomic oxygen) and one water molecule ($2OH^- \rightarrow \frac{1}{2}O_2+H_2O+2e^-$). The electrons pass through the bifunctional plate 1016 where it behaves as it did on the initial monofunctional plate 1012, producing an $H_2$ and two hydroxyl ions. The process continues until reaching the last monofunctional plate 1014 where the electrons exit to this positive plate. The polarity of the plates 1012/1014 is alternated when driven by, e.g., the 50% or 100% duty cycle illustrated in FIGS. 3A and 3B.

Figure 12:
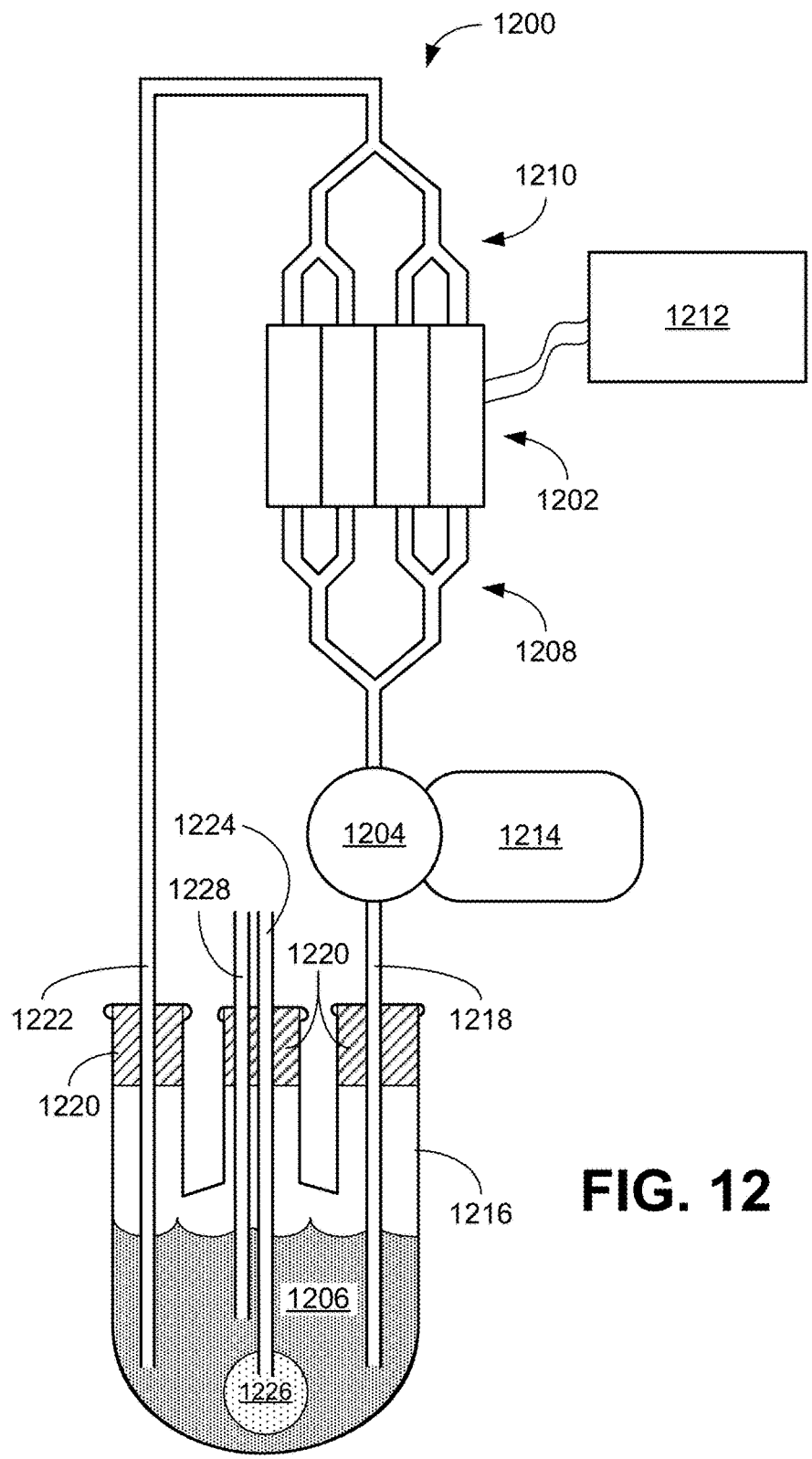
FIG. 12 is a graphical representation of an example of an electrochemical digestion system including a reaction vessel of FIGS. 2, 6, and 10 in accordance with various embodiments of the present disclosure.

Referring next to FIG. 12 shown is an example of an electrochemical digestion system 1200. The electrochemical digestion system 1200 includes a reaction vessel 1202 with one or more cells such as, e.g., the reaction vessels of FIGS. 2, 6, and 10. The electrochemical digestion system 1200 can also include a pump 1204 or other means suitable for inducing flow of a fluid 1206 (e.g., an electrolyte solution including organic molecules) through the reaction vessel 1202. The electrochemical digestion system 1200 may be configured as a loop to allow recirculation of the fluid through the reaction vessel 1202 as depicted in FIG. 12 or may be a single pass system. Multiple reaction vessels 1202 may be grouped in series and/or parallel arrangements to optimize flow and current characteristics. For example, a plurality of reaction vessels 1202, each with one or more cells, may be connected in series to process the fluid 1206 in multiple stages. Mixing chambers may be included between the reaction vessels 1202 to allow for even distribution of the organic molecules between the cells of each reaction vessel 1202. In other configurations, reaction vessels 1202 may be connected for parallel processing of the fluid through multiple reaction vessels 1202. In one embodiment, among others, an electrochemical digestion system 1200 includes the four-cell reaction vessel of FIG. 10. The four cells 1202 were arranged in electrical series and parallel flow with both inlet and outlet manifolds 1208 and 1210 that are configured using three "Y" connectors on each side of the reaction vessel 1202. A power source 1212 supplies a voltage wave shape to the electrodes of the reaction vessel(s) 1202.

The fluid 1206 can be pumped using a small piston or other suitable pump 1204, which may be driven by, e.g., a DC motor 1214. The flow rate of the fluid 1206 may be adjusted to provide an optimum dwell time within the reaction chamber 1202 for digestion of the organic molecules. The fluid 1206 flows from a fluid reservoir 1216 through an inlet manifold 1208 into the cells of the reaction vessel 1202, before passing through the output manifold 1210 (which may comprise a reducing manifold) back to the fluid reservoir 1216. Adjustment of the flow rate of the fluid 1206 may be provided by adjusting the speed of the pump 1204 or by throttling the output of the pump 1204 using, e.g., a valve (not shown). In some implementations, turbulence may be induced at the outlet(s) of the reaction vessel 1202 to improve digestion of the organic molecules by the generated singlet oxygen that my still be present in the fluid 1206. In some cases, a discharge chamber may be included at the outlet(s) of the reaction vessel 1202 or the outlet of the outlet manifold 1210 to promote effective utilization of any singlet oxygen leaving the reaction vessel 1202. In other implementations, turbulence may be induced within the cells of the reaction vessel 1202 to aid in the breakdown of the organic molecules.

Ozone may be added to the fluid 1206 to enhance the electrochemistry and assist in the degradation of the organic molecules. The addition of air (or other gas) bubbles may also influence the reaction by saturating the fluid 1206 with non-reactive gases such as, e.g., nitrogen. The fluid flow rate through the reaction vessel 1202 may also be adjusted to improve or maximize efficiency. For example, a flow that is too high may hinder the reaction by limiting or reducing the time the electrolyte solution (or fluid) is adjacent to an electrode of the reaction vessel 1202. In some implementations, product of the digestion process is separated from the electrolyte solution (or fluid) by centrifuge and/or drying. In other implementations, the product may naturally separate from the electrolyte through buoyancy. The product may then be siphoned off the electrolyte before further processing.

Various experiments were performed using an embodiment of the electrochemical digestion system 1200 of FIG. 12. For example, a pump 1204 such as, e.g., a FLOWJET Model 2100-332 piston pump, which delivers about 0.33 liters/minute for each volt supplied to the DC motor, was used. The fluid reservoir 1216 may be, e.g., a three-necked beaker or other appropriate fluid container suitable for storing the electrolyte solution. Scale of the system 1200 may influence the type of fluid reservoir that is used. In one embodiment, the electrolyte solution 1206 was drawn out of a first neck of the beaker 1216 through a tube 1218 passing through a silicon stopper 1220. After passing through the reaction vessel 1202, the electrolyte solution 1206 is returned to the beaker 1216 through tube 1222, which passes through another silicon stopper 1220 in a second neck of the beaker 1216. In the example of FIG. 12, two tubes pass through another silicon stopper 1220 in the center neck of the beaker 1216. The first provides access for the addition of ozone through tube 1224 and aeration stone 1226. Ozone may be added to the electrolyte solution 1206 to enhance the electrochemistry and assist in the degradation of the organic molecules. The second is a sampling tube 1228, which may have a luger-lok connector for sampling using a syringe.

In each experiment, a total of 500 ml of electrolyte solution 1206 was circulated through the three necked beaker 1216 at about 5 liters/minute flow rate with the four cells of the reaction vessel 1202 electrically connected in series and the electrolyte flowing through an inlet manifold 1208 and outlet manifold 1210. Each cell of the reaction vessel 1202 contained a volume of about 28.5 $cm^3$, so the total reaction chamber volume is about 74 $cm^3$. The electrodes were coated with nano nickel, nano tin and nano cobalt according to the teachings of U.S. Patent App. Pub. 2011/0114496 as described above. The coated electrodes are very effective as water electrolysis electrodes when run in near eutectic KOH or NaOH electrolyte. The electrolyte solution 1206 used in the experiments included 1% organics (e.g., Starch or Cellulose) and 1% ion carrier (e.g., sodium chloride (NaCl), potassium hydroxide (KOH), or sodium hydroxide (NaCl)) in water depending on the particular experiment. Repeated circulation of the electrolyte solution 1206 through the reaction vessel 1202 during excitation of the electrodes by the power source 1212 breaks down the organic molecule chains (e.g., starch) in electrolyte solution 1206.

In a first example of the digestion process, an electrolyte solution 1206 including 1% KOH and 1% corn starch was utilized to study the effect on soluble organic molecules. The organic molecules in the electrolyte solution 1206 were digested using a corrugated coated expanded metal electrode for 24 hours, running at 340 mA (25 mA/$cm^2$). The volume of electrolyte solution 1206 was 500 cc and the total electrode surface area was about 112 $cm^2$. The resulting fluid 1206, after processing through the reactive vessel 1202, was much clearer than the milky appearance of the starting fluid. Evaluation was performed using a colorimetric method using the well known iodine reaction with starch, which produces a deep blue color. Using a spectrophotometer, the colorimetric method was developed, which proved to be reliably quantitative. First, a series of absorption readings were taken, at one low starch concentration, to find the maximum absorption for that blue color. The wavelength was shown to be 620 nm for the iodine-starch complex. Then a series of starch concentrations were run at that wavelength giving a calibration curve. It was recognized that the iodine is actually staining only the amylose portion of starch (about 15%), not the amylopectin (about 85%), but a loss of one strongly suggests that both are being digested.

Samples of the fluid 1206 were drawn frequently during the digestion process and during subsequent digestion experiments using potato starch. The results are given in TABLE 1. The rates shown are the slope at the beginning of digestion, since it finds an asymptote as the supply of starch is lost to digestion.

TABLE 1

|  | mg/hr | mg/AHr | mg/WHr |
|---|---|---|---|
| Corn Starch | 316 | 1859 | 775 |
| Corn St @75 C. | 413 | 2430 | 1781 |
| Potato Starch | 536 | 3037 | 421 |

In a second example of the digestion process, an electrolyte solution 1206 including 1% KOH and 1% wood flour such as, e.g., pine flour, oak flour and micro crystalline cellulose (MCC) was used to study the effect on insoluble organic molecules. The electrolyte solution 1206 including 1% Pine Flour in 1% KOH was digested using a corrugated coated expanded metal electrode running at 340 mA (25 mA/cm$^2$) for 24 hours. The volume of the electrolyte solution 1206 was 500 cc and the total electrode surface area is about 112 cm$^2$. The resulting material appearance was very different from the original appearance with all color being removed and a much lower volume of settled matter.

The samples were vigorously mixed, and 50 milliliters were passed through dried and weighed filter paper in a 55 mm Buchner funnel. The resulting filtrate was collected in a clean, dry and pre-weighed filtration beaker, and 20 milliliter of this was transferred to a ceramic weighing vessel. Both the filter paper and the vessel were then transferred to a 105 degrees Celsius drying oven for about 16 hours. All materials had been pre-dried and weighed, so the weights reflected the new weight added from the insoluble material (on the filter papers) and the soluble materials (in the solution). The results are shown in TABLE 2.

TABLE 2

|  | mg/hr | mg/AHr | mg/WHr |
|---|---|---|---|
| Oak Flour | 5 | 28 | 251 |
| Pine Flour | 17 | 100 | 903 |
| MCC | 6 | 35 | 299 |

A common method to break down organic molecules is to heat the solution to 350 degrees Celsius at which temperature the molecules spontaneously break down. The energy it takes to heat 500 cc of water from 21 to 350 degrees C. is 688 BTU or 202 Wh. In the 24 hours under electrochemical digestion, essentially all of the starch (1% of 500=5 grams=5000 mg) is consumed. To thermally break down that amount of organic material, the rate is 25 mg/WHr just to heat the liquid. Assuming all the organic molecules are consumed, and that the time is very short, the average of all the electrochemical degradation is 738 mg/WHr, or about 30 times more efficient than the thermal method. For the special case of corn starch, the electrochemical digestion method described here is about 71 times more efficient than the typical state of the art.

Other organic molecules such as, but not limited to, cellulose, hemicellulose, lignin, lignite coal slurry, algae (e.g., for lipid extraction), viruses and bacterium for decontamination, wastewater, etc. may be digested using the disclosed system and method. For example, cellulose concentrations in the range from about 0.1% to about 20%, from about 0.5% to about 10%, and from about 0.75% to about 2.5%, may be digested. The concentration of organic molecules may be based upon the viscosity of the electrolyte.

Briefly described, one embodiment, among others, includes a method, comprising providing an electrolyte fluid including organic molecules to a reaction vessel, the electrolyte fluid provided between electrodes of the reaction vessel where no separator exists between the electrodes, and applying a voltage wave shape to the electrodes of the reaction vessel to digest the organic molecules. The flow of the electrolyte fluid may be induced between the electrodes of the reaction vessel. The flow of the electrolyte fluid may be adjusted to improve digestion of the organic molecules. The electrolyte fluid may recirculate between the electrodes of the reaction vessel and through a fluid reservoir. A sample of electrolyte fluid may be obtained from the fluid reservoir. Ozone may be added to the electrolyte fluid. The voltage wave shape may be a stepped square wave with a duty cycle, where the duty cycle of the voltage wave shape is in the range from 50% to 100%, in the range from 80% to 100%, and/or is 100%. The voltage wave shape may be a stepped square wave with a frequency less than 1 Hz and/or less than 1 mHz. The electrolyte fluid may include charge-carrying ions, where a charge carrier is dissolved sodium chloride (NaCl) with a concentration of 2% or less, dissolved potassium hydroxide (KOH) with a concentration of 2% or less, and/or dissolved sodium hydroxide (NaOH) with a concentration of 2% or less. The organic molecules may include cellulose, polysaccharides, lignin, hemicellulose, proteins, algae, a virus, and/or bacterium. The organic molecules may be within wastewater. The electrolyte fluid may be less than 50 degrees Celsius and/or less than 30 degrees Celsius.

Another embodiment, among others, includes a system for digesting organic molecules, comprising a reaction vessel including a plurality of electrodes where no separator exists between the electrodes; an electrolyte fluid including the organic molecules, the electrolyte fluid provided between the plurality of electrodes of the reaction vessel; and a power source configured to apply a voltage wave shape to the electrodes of the reaction vessel to digest the organic molecules. The system may include means for inducing flow of the electrolyte fluid between the electrodes of the reaction vessel. Ozone may be added to the electrolyte fluid. The power source may apply a stepped square wave voltage with a duty cycle greater than 50%. The voltage wave shape may be a stepped square wave with a frequency less than 1 Hz and/or less than 1 mHz. The plurality of electrodes may include planar electrodes. The plurality of electrodes may include two monofunctional electrodes. The plurality of electrodes may further include at least one bifunctional electrode between the two monofunctional electrodes, where the plurality of electrodes define a plurality of cells in the reaction vessel. The power source may apply the voltage wave shape to the two monofunctional electrodes. The plurality of cells may form parallel flow paths for the electrolyte fluid. The plurality of electrodes may include a first set of electrodes in series with a second set of electrodes. The system may comprise a second reaction vessel in series with the first reaction vessel.

It should be emphasized that the above-described embodiments of the present disclosure are merely possible examples of implementations set forth for a clear understanding of the principles of the disclosure. The present embodiments are therefore to be considered in all respects as illustrative and not restrictive. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
   providing an electrolyte fluid including organic molecules to a reaction vessel, the electrolyte fluid flowing between and in contact with electrodes of the reaction vessel where no separator exists between the electrodes, the electrodes defining parallel flow paths through which the electrolyte fluid flows, where the electrodes consist of two monofunctional electrodes comprising a single porous metal component secured to one side of a substrate and at least one bifunctional electrode between the two monofunctional electrodes, the at least one bifunctional electrode comprising two porous metal components secured to opposite sides of a substrate, where the porous metal components of the monofunctional and bifunctional electrodes are formed of the same materials and the electrolyte fluid is less than 100 degrees Celsius; and
   applying a voltage wave shape to the two monofunctional electrodes and not to the at least one bifunctional electrode of the reaction vessel to digest the organic molecules by a breakdown of chains of the organic molecules, where the voltage wave shape reverses polarity applied to the two monofunctional electrodes at a frequency less than 1 Hz.

2. The method of claim 1, comprising inducing the flow of the electrolyte fluid between the electrodes of the reaction vessel.

3. The method of claim 2, comprising adjusting the flow of the electrolyte fluid to improve digestion of the organic molecules.

4. The method of claim 2, wherein the electrolyte fluid recirculates between the electrodes of the reaction vessel and through a fluid reservoir.

5. The method of claim 4, comprising obtaining a sample of the electrolyte fluid from the fluid reservoir.

6. The method of claim 1, further comprising adding ozone to the electrolyte fluid.

7. The method of claim 1, wherein the voltage wave shape is a stepped square wave that reverses polarity from a positive voltage to a negative voltage with a duty cycle.

8. The method of claim 7, wherein the duty cycle of the voltage wave shape is in a range from 50% to 100%.

9. The method of claim 8, wherein the duty cycle of the voltage wave shape is in a range from 80% to 100%.

10. The method of claim 8, wherein the duty cycle of the voltage wave shape is 100%.

11. The method of claim 7, wherein the voltage wave shape is a stepped square wave with a frequency less than 1 mHz.

12. The method of claim 1, wherein the electrolyte fluid includes charge-carrying ions.

13. The method of claim 12, wherein the electrolyte fluid comprises dissolved sodium chloride (NaCl) with a concentration of 2% or less.

14. The method of claim 12, wherein the electrolyte fluid comprises dissolved potassium hydroxide (KOH) with a concentration of 2% or less.

15. The method of claim 12, wherein the electrolyte fluid comprises dissolved sodium hydroxide (NaOH) with a concentration of 2% or less.

16. The method of claim 1, wherein the organic molecules include cellulose.

17. The method of claim 1, wherein the organic molecules include polysaccharides.

18. The method of claim 1, wherein the organic molecules include lignin.

19. The method of claim 1, wherein the organic molecules include hemicellulose.

20. The method of claim 1, wherein the organic molecules include proteins.

21. The method of claim 1, wherein the organic molecules include algae.

22. The method of claim 1, wherein the organic molecules include a virus.

23. The method of claim 1, wherein the organic molecules include bacterium.

24. The method of claim 1, wherein the organic molecules are within wastewater.

25. The method of claim 1, wherein the electrolyte fluid is less than 50 degrees Celsius.

26. The method of claim 1, wherein the electrolyte fluid is less than 30 degrees Celsius.

27. The method of claim 1, wherein the at least one bifunctional electrode and two monofunctional electrodes define a plurality of cells in the reaction vessel.

28. The method of claim 1, wherein the electrodes includes a first set of electrodes consisting of the at least one bifunctional electrode between the two monofunctional electrodes in series with a second set of electrodes consisting of at least one bifunctional electrode between two monofunctional electrodes, wherein the electrolyte fluid sequentially flows through the first set of electrodes and the second set of electrodes.

29. The method of claim 7, wherein the voltage wave shape is a stepped square wave with a frequency less than 0.1 mHz.

30. The method of claim 1, wherein the porous metal components secured to the substrates of the monofunctional and bifunctional electrodes are corrugated.

31. The method of claim 13, wherein the electrolyte fluid comprises dissolved sodium chloride (NaCl) with a concentration of 1% or less.

32. The method of claim 14, wherein the electrolyte fluid comprises dissolved potassium hydroxide (KOH) with a concentration of 1% or less.

33. The method of claim 15, wherein the electrolyte fluid comprises dissolved sodium hydroxide (NaOH) with a concentration of 1% or less.

* * * * *